United States Patent
Holmes et al.

(10) Patent No.: US 10,782,473 B2
(45) Date of Patent: Sep. 22, 2020

(54) OPTICAL FIBRE ASSEMBLY AND METHOD OF MAKING AN OPTICAL FIBRE ASSEMBLY

(71) Applicant: University of Southampton, Hampshire (GB)

(72) Inventors: Christopher Holmes, Southampton (GB); Peter George Robin Smith, Romsey (GB); James Christopher Gates, Ringwood (GB); Lewis Glynn Carpenter, Reading (GB)

(73) Assignee: University of Southampton, Southampton, Hampshire (GB)

( * ) Notice: Subject to any disclaimer, the term of this patent is extended or adjusted under 35 U.S.C. 154(b) by 92 days.

(21) Appl. No.: 15/319,964

(22) PCT Filed: Jun. 17, 2015

(86) PCT No.: PCT/GB2015/051769
§ 371 (c)(1),
(2) Date: Dec. 19, 2016

(87) PCT Pub. No.: WO2015/193662
PCT Pub. Date: Dec. 23, 2015

(65) Prior Publication Data
US 2017/0139133 A1    May 18, 2017

(30) Foreign Application Priority Data
Jun. 18, 2014  (GB) .................................. 1410829.4

(51) Int. Cl.
G02B 6/36   (2006.01)
G02B 6/122  (2006.01)
(Continued)

(52) U.S. Cl.
CPC ............... *G02B 6/122* (2013.01); *G02B 6/34* (2013.01); *G02B 6/3612* (2013.01); *G02B 6/3692* (2013.01); *G02B 2006/12111* (2013.01)

(58) Field of Classification Search
CPC .............................. G02B 6/122; G02B 6/3612
See application file for complete search history.

(56) References Cited

U.S. PATENT DOCUMENTS 4,204,744 A * 5/1980 Wittmann ............ G02B 6/3502
                                                  385/22
5,471,552 A * 11/1995 Wuu ...................... G02B 6/136
                                                  216/24
(Continued)

FOREIGN PATENT DOCUMENTS

JP    S63 69734 A    3/1988
WO    99/06859 A1    2/1999
(Continued)

OTHER PUBLICATIONS

International Search Report and Written Opinion for corresponding Patent Application No. PCT/GB2015/051769 dated Aug. 25, 2015.
(Continued)

*Primary Examiner* — Sung H Pak
*Assistant Examiner* — Hoang Q Tran
(74) *Attorney, Agent, or Firm* — Renner, Otto, Boisselle & Sklar, LLP

(57) ABSTRACT

A method of forming an optical fibre assembly, comprises providing a planar substrate made of a first material; positioning an optical fibre with an outer layer of a first glass material on a surface of the substrate to form a pre-assembly; depositing a further glass material such as silica soot onto the pre-assembly, over at least a part of the optical fibre and adjacent parts of the substrate surface; and heating the pre-assembly to consolidate the further glass material into an amorphous volume in contact with at least parts of the
(Continued)

surface of the substrate and the outer layer of the optical fibre, thereby bonding the optical fibre to the substrate to create the optical fibre assembly.

25 Claims, 12 Drawing Sheets

(51) Int. Cl.
*G02B 6/34* (2006.01)
*G02B 6/12* (2006.01)

(56) References Cited

U.S. PATENT DOCUMENTS

| | | | |
|---|---|---|---|
| 5,682,453 A | 10/1997 | Daniel et al. | |
| 5,703,980 A * | 12/1997 | MacElwee | G02B 6/2551 385/30 |
| 6,143,108 A | 11/2000 | Risen et al. | |
| 6,490,394 B1 * | 12/2002 | Beall | C03C 10/0027 385/129 |
| 6,549,713 B1 * | 4/2003 | Pi | G02B 6/3636 385/137 |
| 7,058,275 B2 | 6/2006 | Sezerman et al. | |
| 7,620,277 B1 | 11/2009 | Ashley et al. | |
| 2005/0213922 A1 | 9/2005 | Sezerman et al. | |
| 2005/0238312 A1 * | 10/2005 | Meder | C03C 8/245 385/137 |
| 2006/0002664 A1 * | 1/2006 | Benzoni | G02B 6/12004 385/88 |
| 2014/0106094 A1 * | 4/2014 | Mundy | C03B 19/1492 428/34.4 |

FOREIGN PATENT DOCUMENTS

| | | |
|---|---|---|
| WO | 01/53862 A1 | 7/2001 |
| WO | 03/023460 A2 | 3/2003 |
| WO | 03/023460 A3 | 3/2003 |

OTHER PUBLICATIONS

Search Report for corresponding United Kingdom Patent Application No. 1410829.4 dated Dec. 15, 2014.
Ripin et al.; "High efficiency side-coupling of light into optical fibres using imbedded v-grooves", Electronics Letters, vol. 31, No. 25, Dec. 7, 1995, pp. 2204-2205.
Koplow et al.; "A New Method for Side Pumping of Double-Clad Fiber Sources", IEEE Journal of Quantum Electronics, vol. 39, No. 4, Apr. 2003, pp. 529-540.
Wnuk et al.; "Process for Mounting and Packaging of Fiber Bragg Grating Strain Sensors for use in Harsh Environment Applications", Smart Structures and Materials 2005: Smart Sensor Technology and Measurement Systems, Proceedings of SPIE vol. 5758, pp. 46-53.
Knechtel, Roy; "Glass frit bonding: an universal technology for wafer level encapsulation and packaging", Microsyst Technol (2005) 12, pp. 63-68.
Saran et al.; "Anodic bonding of optical fibers-to-silicon for integrating MEMS devices and optical fibers", Journal of Micromechanics and Microengineering, 13 (2003), pp. 346-351.
Noordegraaf et al.; "Efficient multi-mode to single-mode coupling in a photonic lantern", Optics Express, vol. 17, No. 3, Feb. 2, 2009.
Kawachi et al.; "Fabrication of SiO2-TiO2 glass planar optical waveguides by flame hydrolysis deposition", Electronics Letters vol. 19, No. 15, Jul. 21, 1983, pp. 583-584.

* cited by examiner (a)

(b)

OPTICAL FIBRE ASSEMBLY AND METHOD OF MAKING AN OPTICAL FIBRE ASSEMBLY

This application is a national phase of International Application No. PCT/GB2015/051769 filed Jun. 17, 2015 and published in the English language, which claims priority to United Kingdom Patent Application No. GB 1410829.4 filed Jun. 18, 2014 which are hereby incorporated herein by reference in their entirety.

BACKGROUND OF THE INVENTION

The present invention relates to optical fibres devices and methods for making such devices.

There are many optical applications and geometries in which precise positioning and bonding of an optical fibre onto a planar optical substrate is desired. A variety of techniques and materials for bonding are known, including solder, glass fit, glues and epoxies. These are associated with a range of drawbacks and disadvantages, such as mechanical weakness in harsh environments (including high temperatures, high pressures, and exposure of common chemicals), and poor optical characteristics (including high optical loss, significant scattering, and modal and refractive index mismatch between the bonding material and the optical fibre).

For example, U.S. Pat. Nos. 7,058,275 and 7,620,277 describe securing optical fibres to a substrate by placing the fibres in grooves on a substrate or chip and applying a glue to hold the fibres in the grooves. Index matched adhesive has been used to assist in coupling light into the cladding of an optical fibre [3], including in a top access geometry without transmission through the polymer adhesion layer [4]. Problems with these latter arrangements include the lack of a planar format for the adhesive layer so that one cannot take advantage of planar hybridisation, and the inability of polymer adhesive to form a mechanically robust composite able to withstand environmental rigours such as elevated temperatures owing to factors including thermal expansion coefficient mismatch. Also, the adhesive layer is not inherently conducive to the addition of dopants, so cannot be tailored for properties such as optical gain.

In other work, epoxy and ceramic filler has been used to bond and encapsulate a fibre Bragg grating for strain sensing [5], and glass frit bonding has been proposed for wafer level hermetic encapsulation and packaging of MEMS components [6]

An alternative bonding process is fusion splicing, used to secure an optical fibre to a silicon wafer with the aim of integrating optical fibres to MEMS components [7].

In view of the various disadvantages of existing bonding materials and techniques, there is a requirement for an improved method.

SUMMARY OF THE INVENTION

Accordingly, a first aspect of the present invention is directed to a method of forming an optical fibre assembly, comprising providing a planar substrate made of a first material; positioning an optical fibre with an outer layer of a first glass material on a surface of the substrate to form a pre-assembly; depositing a further glass material onto the pre-assembly, over at least a part of the optical fibre and adjacent parts of the substrate surface; and heating the pre-assembly to consolidate the further glass material into an amorphous volume in contact with at least parts of the surface of the substrate and the outer layer of the optical fibre, thereby bonding the optical fibre to the substrate to create the optical fibre assembly.

The first glass material and the further glass material may be substantially the same material or are miscible alloys of each other. Further, the first material may be substantially the same as or a miscible alloy of the first glass material and/or the further glass material. By suitable choice of materials, an interface between the outer layer and the amorphous volume and/or an interface between the amorphous volume and the planar substrate may be made optically transmissive to wavelengths of light supported by the optical fibre. Also, anisotropic stress will typically exist in the consolidated glass, which contributes to mechanical and environmental robustness. This stress can be tuned through selection and manipulation of the thermal expansion coefficient of the substrate material and the consolidated material to achieve desired structural properties. Hence, the invention can provide optically and structurally superior fibre assemblies compared to those fabricated by known methods.

The further glass material may comprise silica or a non-silicate glass. The further glass material may be in the form of a soot. The soot may be deposited using flame hydrolysis deposition, for example, although other deposition methods may be used.

The substrate may have an oxide layer on its surface. This can reduce or prevent unwanted reactions between the substrate material and components of the further glass material during the consolidation step. The oxide layer may be thermally grown, and the method may further comprise forming the oxide layer on the surface of the substrate.

The further glass material may include one or more dopants. In this way, the function and operation of the fibre assembly can be tailored for a variety of optical applications. The method may hence further comprise adding one or more dopants to the further glass material after depositing it, for example by solution doping or pressurised gas saturation. Alternatively, if flame hydrolysis deposition is used to deposit the further glass material, the method may further comprise adding one or more dopants to the silica soot by injecting precursor vapours containing the one or more dopants into the flame hydrolysis deposition flame. The one or more dopants may comprise one or more of germanium, phosphorus, boron, aluminium, lead, bismuth, erbium, titanium, tin, ytterbium, neodymium, sodium, barium, calcium, lanthanum, holmium and silver.

Positioning the optical fibre on the surface of the substrate may comprise laying the optical fibre in a trench or groove in the substrate surface. Then, the method may further comprise positioning one or more further optical fibres on the surface of the substrate by laying the one or more further optical fibres in one or more further trenches or grooves in the substrate surface, where at least two trenches or grooves have different depths. Both complex and simple multi-fibre geometries can thereby be realised.

Other techniques for positioning the optical fibre onto the surface of the substrate include fusion splicing the optical fibre into its position, passing the optical fibre through one or more holes in the substrate, and holding the optical fibre in position with one or more shims or mechanical clips.

A method according to any one of claims 1 to 14, wherein the optical fibre includes a Bragg grating, and the substrate includes a planar waveguide having a Bragg grating and positioning the optical fibre on the surface of the substrate includes monitoring light reflected or transmitted from the Bragg gratings.

The method may further comprise masking one or more areas of the substrate surface and/or the positioned optical fibre before depositing the further glass material to prevent deposition of the further glass material onto the masked areas. The masking may be combined with the use of shims to hold the optical fibre in position, where the shims perform both the masking and the holding functions.

Additionally or alternatively, the method may further comprise, after consolidation, machining the optical fibre assembly to remove a part or parts of the substrate and/or the optical fibre.

The substrate may be a silica, silicon or sapphire substrate, or be made from other glass or crystal materials.

A second aspect of the invention is directed to an optical fibre assembly comprising a planar substrate made of first material; an optical fibre with an outer layer of a first glass material; and an amorphous volume of a further glass material in contact with at least parts of the surface of the substrate and the outer layer of the optical fibre which bonds the optical fibre to the substrate. The optical fibre assembly may further comprise a planar waveguiding structure defined in the substrate, the optical fibre and the planar waveguiding structure being in optical alignment with each other. Additionally or alternatively, the optical fibre assembly may further comprise one or more additional optical fibres bonded to the substrate with the said or one or more further amorphous volumes of the further glass material.

A third aspect of the invention is directed to an optical fibre assembly fabricated according to the method of the first aspect.

BRIEF DESCRIPTION OF THE DRAWINGS

For a better understanding of the invention and to show how the same may be carried into effect reference is now made by way of example to the accompanying drawings in which.

DETAILED DESCRIPTION

The invention addresses the issue of bonding optical fibres to substrates to make fibre assemblies by proposing the use of a glass material applied over an optical fibre positioned on a substrate which is then consolidated into an amorphous form and thereby secures the optical fibre to the substrate in a manner which is both mechanically and optically robust. Precise placement of the optical fibre can be achieved, and the glass material can be selected to provide many desirable optical properties and functions, such as good transmission characteristics between the fibre, the glass material and the substrate, and doping to modify optical gain and refractive index. Appropriate choices for the substrate material, the outer layer of the fibre and the glass material to be consolidated can produce a uniform optical composition. For example, the three materials might be the same or might be miscible alloys of each other or otherwise chemically compatible. The consolidation stage then produces a fused glass structure which is free from abrupt mechanical or optical boundaries.

Methods

Figure 1:
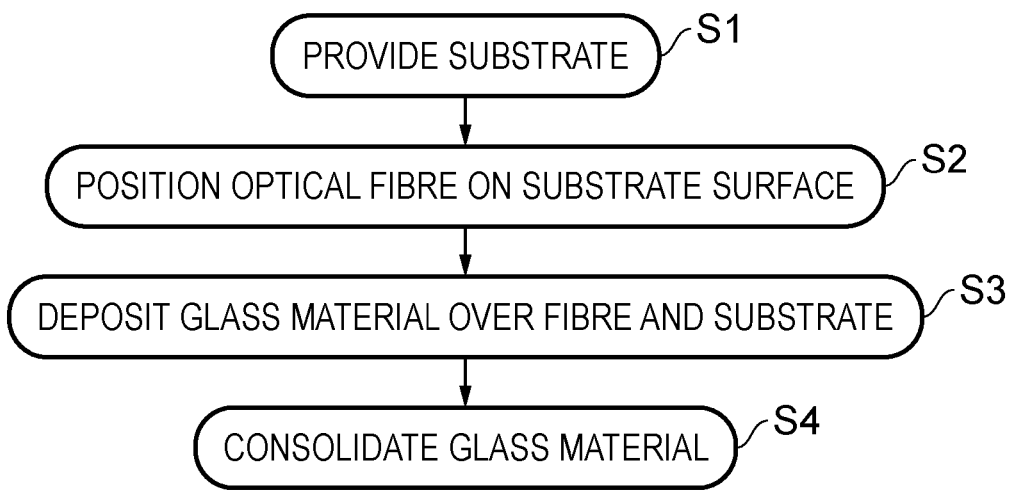
FIG. 1 shows a flow chart of steps in a method according to an embodiment of the invention.

FIG. 1 shows a flow diagram detailing various steps in a method according to an embodiment of the invention.

In a first step S1, a suitable substrate is provided. The substrate will typically be a planar substrate or wafer, and should comprise a material suitable for the intended optical purpose of the final fibre assembly. For example, the substrate may be silica, silicon or sapphire, although other crystal or glass based substrate materials are not precluded. A substrate of an optical material which is the same as, similar to, a miscible alloy of, or otherwise chemically compatible with, the materials from which the optical fibre and the fusing glass material are made will provide good results.

In a second step S2, the optical fibre is placed onto a surface of the substrate and arranged into a desired location and position to create a pre-assembly. The optical fibre will have an outer layer (typically the cladding layer) made from a glass material, and this may be selected as discussed above with regard to the substrate material, if desired. Various techniques may be used to secure the fibre into the desired position; some examples are discussed further below.

In a third step S3, the glass material which is to be used to bond the optical fibre to the substrate is deposited onto the pre-assembly, over all or parts of the fibre and the substrate. At least part of the optical fibre and at least part the substrate surface which is adjacent to the optical fibre, the parts being contiguous, receive the deposited glass material. Hence, there is formed at least one region of deposited glass material which extends over both part of the optical fibre and part of the substrate. If desired, the full length of the optical fibre which is supported by the substrate may receive the deposited glass material, but this is not essential. Similarly, the deposited glass material might extend across the full width of the substrate surface on either side of the optical fibre, but again this is not essential.

The glass material may, if desired, be selected as discussed above with regard to the substrate material, so that it is the same as, similar to, chemically compatible with, or a miscible alloy of, either or both of the substrate material and the fibre outer layer material. Preferably, the glass material is an optical grade glass material, so as to provide high quality optical performance in the final fibre assembly. An "optical grade" material is typically understood to be a material having low propagation loss, including low scattering. While there is no formal numerical definition to classify a material as "optical grade", as an example silica for use in a telecommunication applications might typically have a loss of less than 5 dB/cm to be considered as optical grade. Additionally, materials and optical components considered to be optical grade will generally have consistent or uniform refractive index and thickness. Optical grade substrates, for example, will have uniform refractive index and thickness across a wafer and also from wafer to wafer. Also for the present invention, the glass material is selected so as to be able to undergo a consolidation phase in a subsequent heating step, during which the applied heat acts to turns the deposited glass material into a single amorphous volume of glass. Any glass material with the appropriate properties can be used; the invention is not limited to glasses of any particular chemical composition. As an example, the glass material might be silica, but non-silicate based glasses, for example those based on germanium or other elements, are not precluded.

The form of the deposited glass material will depend on the method used to deposit it. For example, the glass material may have the form of a soot, such as a silica or non-silicate soot. A soot of optical material, such as silica, comprises a particulate form of the material, with particle sizes typically of the order of micrometre diameters, although the actual size will depend on the deposition technique. The deposition step thus creates a thin layer of soot particles that overlies the optical fibre and adjacent areas of the substrate surface. The layer, which may alternatively comprise the glass material in a form other than soot may have a thickness in the range of less than a micrometre (suitable for mechanical tacking, discussed further later) up to tens of micrometres or more if one wishes to partially or completely bury the optical fibre in the amorphous volume.

Any suitable technique can be used to deposit the glass material. Various techniques are known for forming and depositing soot materials, for example, such as flame hydrolysis deposition. Spin coating processes can also be used for deposition, for example with colloidal materials. The material might be sprayed on.

Flame hydrolysis deposition (FHD) involves injecting precursor gases or vapours comprising the constituent elements of the required material into a flame of hydrogen and oxygen produced by a torch. To deposit undoped silica, the precursor is usually silicon trichloride ($SiCl_3$) or silicon tetrachloride ($SiCl_4$). Other precursors can be used as appropriate for depositing non-silicate glasses. The flame is passed over the substrate, for example by mounting the substrate onto a turntable and linearly traversing the flame along the turntable radius as the turntable rotates. The torch may be arranged above or below the substrate, and other mechanisms for directing the flame onto the substrate may be employed. Redox reactions of the gases occur within the flame; these produce the soot particles which deposit onto the substrate and the supporting turntable. The soot particle size and composition depend on the conditions in the flame and the choice of precursor gases. FHD is an established technique which the skilled person will be able to implement without difficulty. An advantage of FHD in the present context is its ability to quickly deposit relatively thick layers of material (tens of micrometres).

Usefully, the FHD flame may be traversed over the substrate and the optical fibre positioned thereon before the precursor gases are introduced. This acts to clean the substrate and the fibre by removing any organic material that might be present on the substrate and fibre surfaces from prior manufacturing and handling stages. Other cleaning techniques might be used instead, however, or the cleaning may be omitted. Cleaning helps to ensure good deposition and subsequent consolidation, however.

In step S4, the pre-assembly with the deposited glass material is heated so as to consolidate the deposited glass material. Any heating method may be used which is capable of raising the deposited glass material to a sufficient temperature for an appropriate period to produce the required consolidation into an amorphous glass material. The resulting material has the form of a single amorphous volume of glass which is in contact with, and therefore has interfaces with, both the optical fibre and the substrate. This acts to join the optical fibre to the substrate both mechanically and optically. For example, the pre-assembly may be heated in a furnace. For silica soot, the temperature might be elevated to 1100° C. or above, and maintained at that temperature for a dwell time of several hours during which the consolidation takes place. The pre-assembly may be inserted into the furnace at a temperature above room temperature, for example at about 500° C. The heating and subsequent cooling of the furnace may be achieved slowly, for example at a rate of 5° C. per minute, to avoid damage to the furnace. The actual maximum temperature and dwell time required for consolidation will depend on the composition and nature of the deposited glass material. The furnace may optionally be purged with helium to remove bubbles forming in the glass, and/or with oxygen to control the oxidation state and vapour pressure of the composition. After consolidation, the fibre assembly may be removed from the furnace at a temperature above room temperature, perhaps substantially above room temperature, for example 500° C. or above. Removal at an elevated temperature can prevent or reduce crystallisation or phase separation of the glass; the temperature and requirement for this again depends on the glass material composition.

The resulting optical fibre assembly comprises the substrate with the optical fibre permanently secured into position by the amorphous glass material. The bond is more mechanically robust that known techniques using solder, epoxy or glue. The use of a glass material to bond a glass fibre to a substrate made from glass or crystal gives an improved uniformity of structure so that optical coupling between the various components is enhanced and can be tailored. The glass materials at the interfaces between the components will fuse and blend somewhat during consolidation so that abrupt boundaries are avoided. For example, the various materials can be chosen such that the interface between the outer layer of the fibre and the amorphous volume of glass material, and/or the interface between the amorphous volume and the substrate surface are optically transmissive to wavelengths of light supported by the optical fibre. In this way, light can be efficiently coupled into and out of the fibre, depending on the intended function of the optical fibre assembly.

The example method depicted in FIG. 1 can be enhanced and extended by various other steps.

Figure 2:
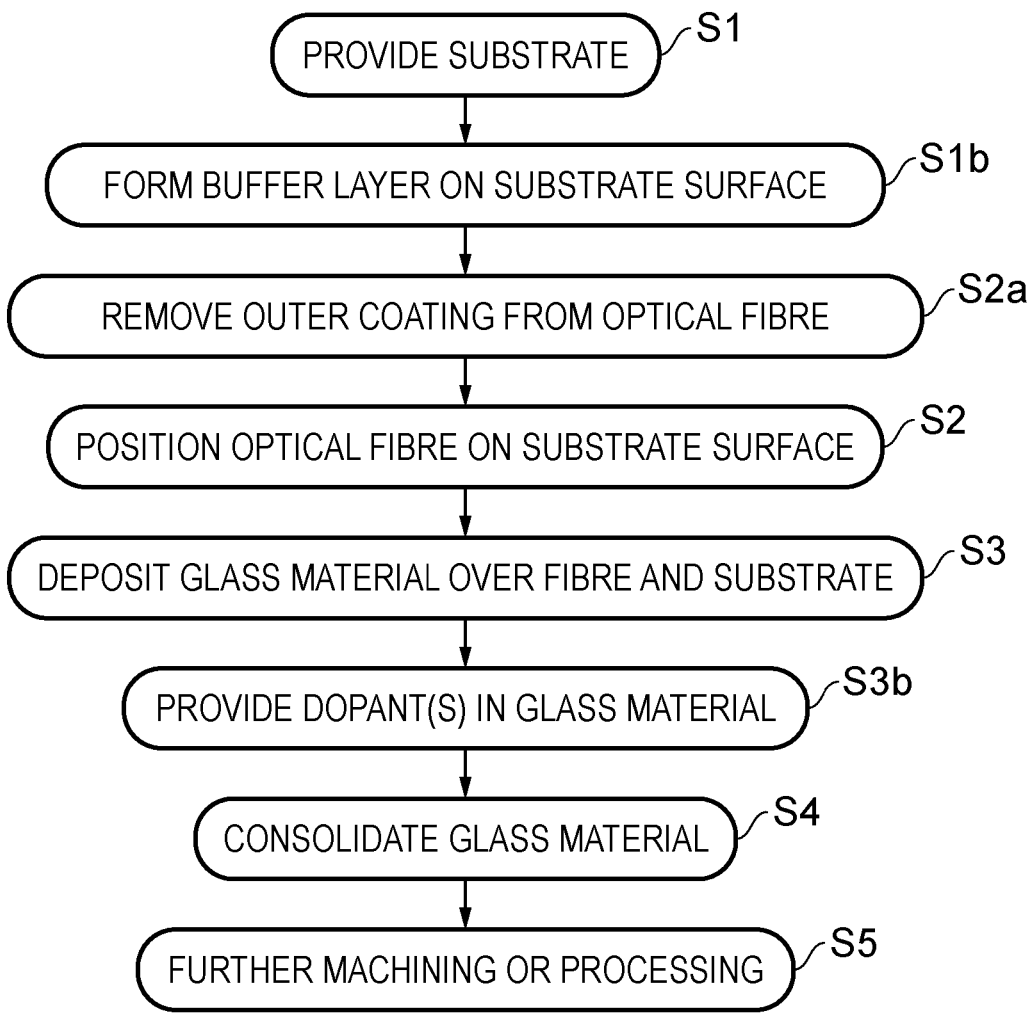
FIG. 2 shows a flow chart of steps in a method according to a further embodiment of the invention.

FIG. 2 shows a flow diagram detailing various steps in a method according to a further embodiment of the invention.

This embodiment includes the steps S1-S4 of the FIG. 1 embodiment, plus some additional steps which can be optionally included.

For example, a step S1$b$ may follow the step S1 of providing the substrate. In step S1$b$, a buffer layer is formed on the substrate. The buffer layer comprises a thin layer, typically about 1 to 10 μm in thickness, of oxide on the surface of the substrate. The oxide layer may be thermally grown, for example. The buffer layer is useful in that it acts as a buffer between the deposited glass material and the substrate for various dopants which might be included in the deposited glass material. In the absence of the oxide, undesirable chemical reactions involving the dopants can occur between the substrate and the doped glass material during consolidation. Observations suggest that, for a silicon substrate, these reactions may largely be due to the presence of a $PCl_3$ precursor during FHD, since fabrication without this gas has not shown the reactions. The formation of the buffer layer can be implemented as a separate step in the method, or a substrate already having a buffer layer might be obtained.

It may also be necessary to perform some preparation work on the optical fibre before positioning it onto the substrate surface. For example, the method may include an additional step S2$a$ in which an outer coating, such as a polymer coating, may need to be removed (using fibre strippers or a chemical bath, for example) from the optical fibre to expose the glass outer layer. Some or all of a cladding layer of the fibre might also be removed, if it desired that the core of the fibre be directly or closely bonded to the substrate. Thus, the fibre is prepared by removing as much of any outer coatings or layers as desired, to reveal a layer of glass material which is going to be in placed in contact with the substrate surface during positioning of the fibre in step S2. Cleaning of the fibre might also be appropriate after coating and/or cladding removal, to remove any residual material. For example, acetone may be used to remove remaining traces of polymer.

A further optional step is the addition of dopants to the deposited glass material, indicated as step S3$b$. Dopants can be included to provide a variety of characteristics by which the fibre assembly can be tailored. For example, some dopant materials are useful for providing optical gain (such as erbium, ytterbium, neodymium and holmium), others can provide photosensitivity (such as germanium, tin, lead, silver and boron), and still others can control or modify melting temperature, thermal expansion, stress and refractive index. Other potential dopant species include aluminium, bismuth, titanium, sodium, barium, calcium and lanthanide. The use of dopants in the engineering of optical materials is well-known.

Depending on the doping process used, the doping step S3$b$ may be a separate stage or may be integral with the depositing step S3. For example, if FHD is used to deposit the glass material in step S3, a convenient way to introduce dopant materials is to add precursor gases which include the required dopants during the FHD process. For example, gases such as germanium tetrachloride ($GeCl_4$), phosphorous oxychloride ($POCl_3$), phosphorous trichloride ($PCl_3$) and boron trichloride ($BCl_3$) are common examples in FHD deposition, and other precursor dopant gases may also be used as described later.

Doping is not limited to this technique, however, and other processes may be employed if desired. For example, dopant species may be added to the glass material in a separate step after deposition, by processes such as solution doping and pressurised gas saturation.

If desired, various post-processing stages in a step S5 may be performed on the optical fibre assembly after the consolidation in step S4, to produce a finished optical fibre device or component. Additional components such as further fibres and lenses can be added. Machining can be performed to cut the assembly into portions, or to grooves or trenches into the assembly. Wet or dry etching can be used to remove parts of the amorphous glass volume, for example to include photolithographic integrated optical features or microfluidics. Some of these stages are described further below with regard to particular examples of optical fibre assembly according to embodiments of the invention.

Figure 3:
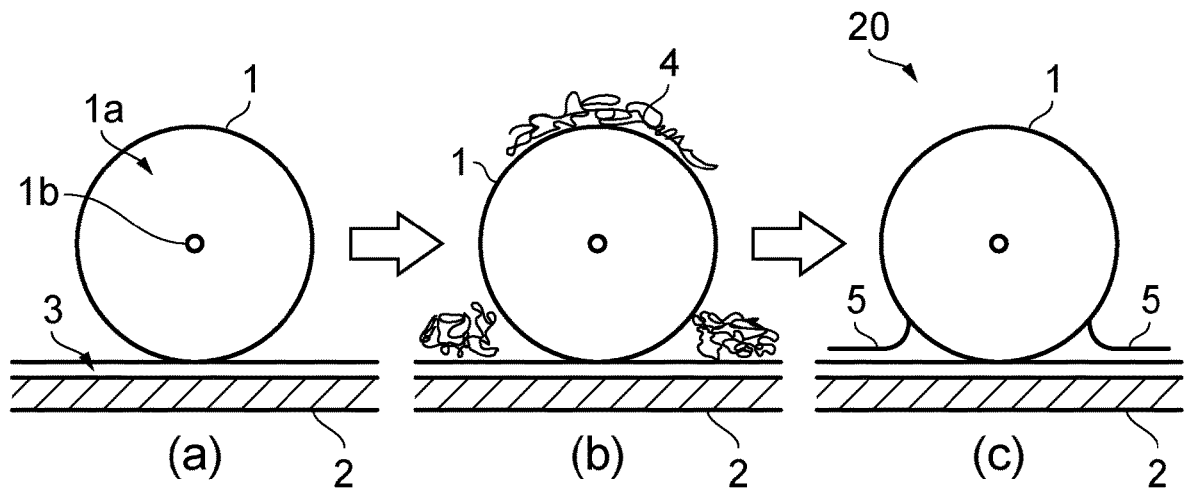
FIG. 3 shows a schematic representation of steps in a method according to an embodiment of the invention.

FIG. 3 shows a series of cross-sectional views through an assembly at various stages of the methods described with reference to FIGS. 1 and 2. FIG. 3($a$) shows the pre-assembly, comprising an optical fibre 1 having a glass material outer layer 1$a$ (the cladding in this example) and a core 1$b$ positioned on the surface of a planar silicon substrate 2 having a buffer layer 3 of thermal oxide on its surface. In FIG. 3($b$) the glass material 4, in this example soot deposited by FHD, such as silica soot, has been deposited onto the fibre 1 and the substrate 2. Hence, the soot 4 is on the top of the fibre 1, and lies on the substrate 2 in areas adjacent to the fibre 1. FIG. 3($c$) shows the optical fibre assembly 20 after consolidation, in which the soot 4 has consolidated into the amorphous material 5. The amorphous material 5 forms a volume which is in contact with and consolidated with the surface of the substrate 2 and the optical fibre 1, so as to bond the fibre 1 to the substrate 2.

EXAMPLE

As an example, an optical fibre assembly has been fabricated using FHD to deposit silica soot. A section of SMF-28 optical fibre was cut and the outer polymer coating removed mechanically using fibre strippers. After cladding removal the fibre was cleaned with acetone to remove residual polymer. The fibre was next positioned upon a silicon wafer substrate. The silicon wafer had a 1 μm thermally grown oxide buffer layer.

To secure the fibre in position on the wafer, a silicon shim was used, which rested on top of the fibre and kept it in situ under gravitational force. Alternative methods of fixture and/or shims made of different materials are possible; options are described further later. Then, FHD was carried out. To ensure that the fibre and wafer were free from organics prior to deposition, the hydrogen oxygen FHD flame was traversed over the sample. After this cleaning pass, subsequent passes of hydrogen oxygen flame with precursors of $SiCl_4$, $PCl_3$ and $BCl_3$ were made to deposit soot. Table 1 shows the quantities of precursor gas used for depositing silica soot in two successful demonstrations of fibre in FHD and the potential range of precursor quantities that could be implemented as derived from existing FHD recipes ranges.

TABLE 1

| Gas | Demonstration # 1 | Demonstration # 2 | Possible Ranges |
|---|---|---|---|
| $H_2$ | 6.5 l/min | 6.5 l/min | 2-10 l/min |
| $O_2$ | 1.9 l/min | 1.9 l/min | 2-10 l/min |
| Ar | 8.0 l/min | 8.0 l/min | 2-10 l/min |
| $SiCl_4$ | 139 sccm | 139 sccm | 0-200 sccm |
| $GeCl_4$ | 0 sccm | 0 sccm | 0-200 sccm |
| $PCl_3$ | 31 sccm | 31 sccm | 0-50 sccm |
| $BCl_3$ | 70 sccm | 0 sccm | 0-100 sccm |

Following soot deposition a thermal consolidation was made, using a Severn Thermal Solutions vertical furnace to consolidate the soot. The consolidation cycle began at 500° C., raising the wafer temperature by 5° C. per minute to a maximum temperature of 1100° C. This temperature was maintained for a dwell time of 4 hours. The temperature was then reduced at the same rate to 600° C., at which point the completed fibre assembly was unloaded.

Figure 4:
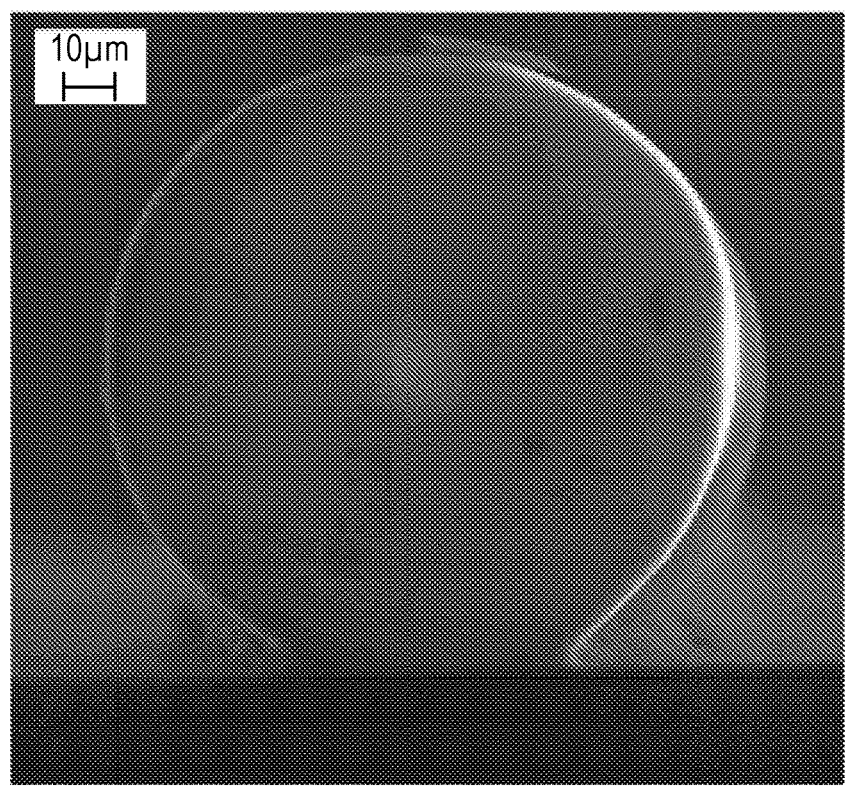
FIG. 4 shows a SEM image of a fibre assembly fabricated using a method according to an embodiment of the invention.

FIG. 4 shows a scanning electron microscope image of the fibre assembly made using the FHD gas composition shown as "Demonstration #1" in Table 1. The image is an axial cross-section through the optical fibre, showing how it is mechanically secured to the silica-on-silicon planar wafer substrate using a 2 μm layer of FHD silica soot that has been deposited and consolidated.

By further experimentation, it has been found that an optical fibre placed on the substrate prior to soot deposition becomes adhered to the substrate in the composite glass structure formed by the consolidation step. However, if the optical fibre is placed on the substrate after soot deposition, the consolidation does not bond the fibre to the substrate.

Fibre Placement

Once the optical fibre has been placed on the substrate, it needs to be held in position sufficiently securely to maintain its placement during the depositing and consolidating steps. There are various techniques to achieve this, some of which will now be described, and others of which will be apparent to the skilled person. Any technique compatible with the subsequent depositing and consolidating can be used.

Figure 5:
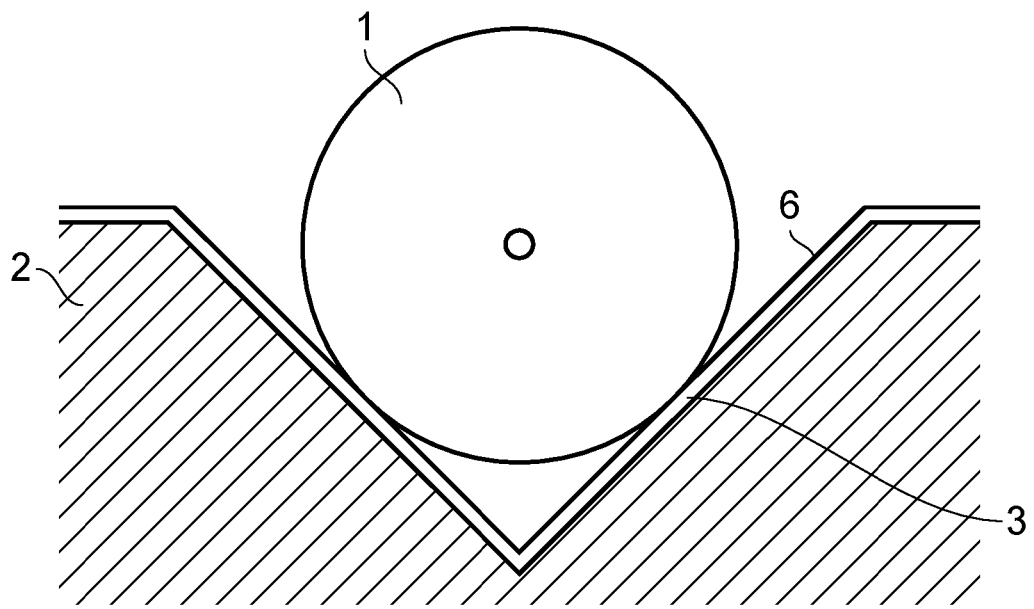
FIG. 5 shows a cross-sectional end view of an optical fibre positioned on a substrate in a step of a method according to the invention, using a v-groove for positioning.

FIG. 5 shows a cross-sectional view of a placement method using a groove. A v-shaped groove 6 is cut into the surface of the substrate 2, and the optical fibre 1 is laid in the groove 6. In this example, a buffer layer 3 is included, which has been extended so as to line the groove 6 so that the fibre 1 lies on the buffer layer.

Figure 6:
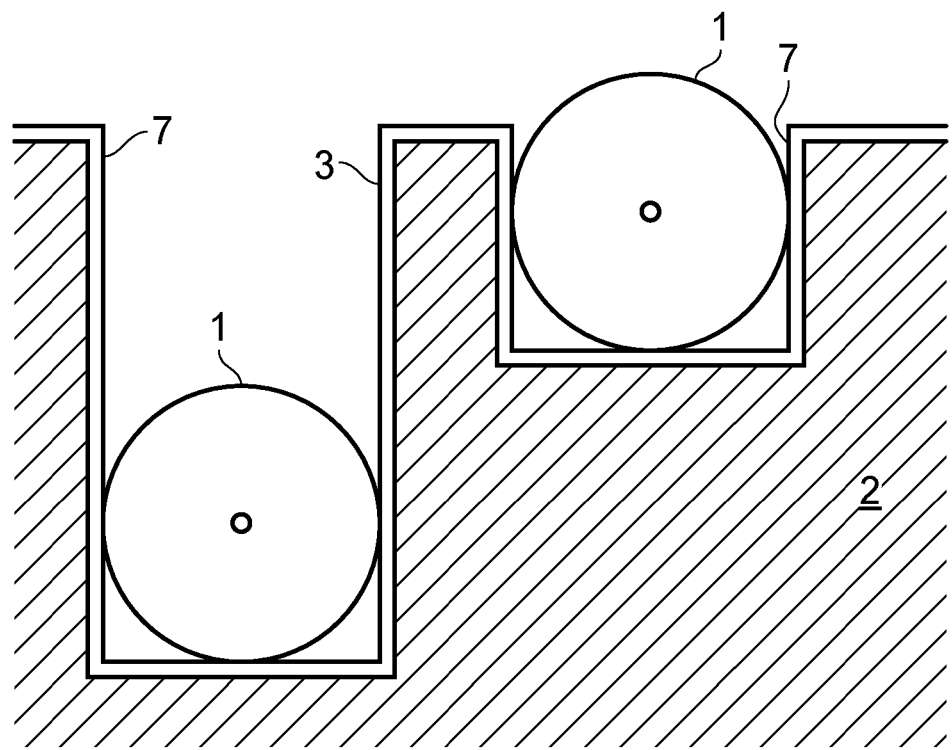
FIG. 6 shows a cross-sectional end view of two optical fibres positioned on a substrate in a step of a method according to the invention, using trenches for positioning.

FIG. 6 shows a cross-sectional view of a similar method, in which a straight-sided vertical trench 7 cut into the substrate 2 is used to position the optical fibre 1. As with the FIG. 5 embodiment, the buffer layer 3 is extended to line with inside surface of the trench 7. A useful feature of groove or trench laying is that two or more trenches can be cut to different depths on a single substrate, thereby allowing fibres to be bonded at different depths in one device. FIG. 6 shows two fibres 1 in different depth trenches 7 which are adjacent. However, more complex geometries in which fibres at different depths pass over one another can also be implemented.

Figure 7:
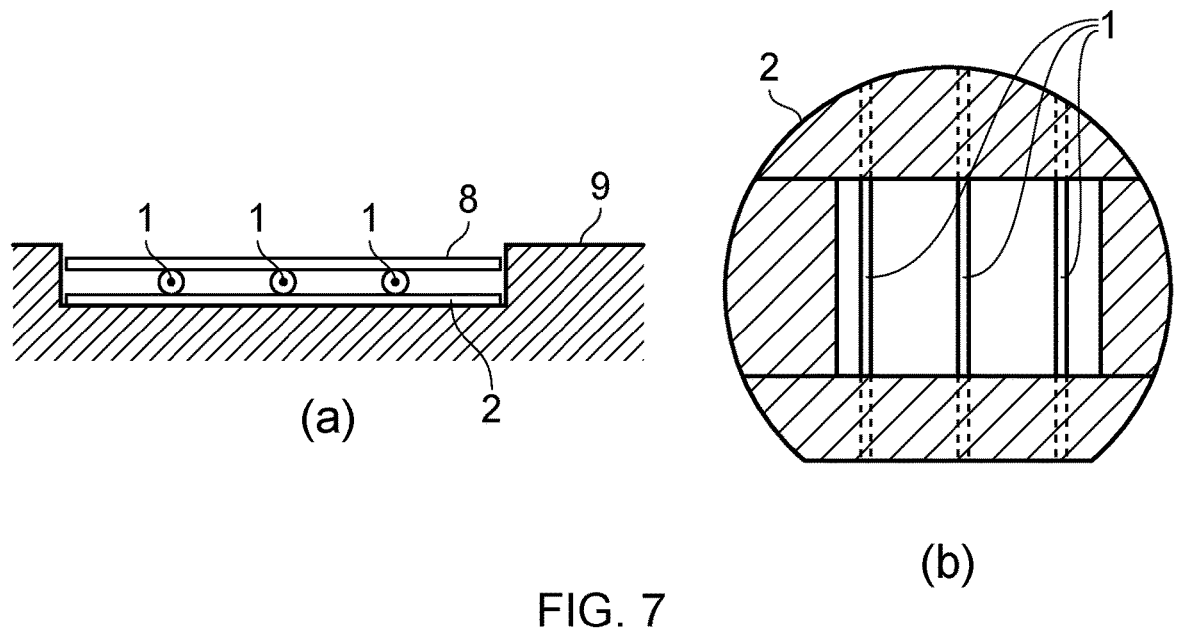
FIGS. 7(a) and 7(b) show a cross-sectional end view and a plan view of an optical fibre positioned on a substrate in a step of a method according to the invention, using shims for positioning.

FIG. 7 shows views of a placement method using one or more shims. FIG. 7(a) shows a cross-sectional view. A silicon carbide holder 9 holds the substrate 2 in a recess, and three (in this example) optical fibres 1 are placed on the substrate surface. A shim 8 is placed on top of the fibres to hold them in place more securely under gravitational force. In this example, the shim is made of silicon, although other materials can be used. Clearly, the shim 8 will obscure those parts of the fibres and substrate over which it is placed, so the glass material for consolidation will be deposited elsewhere. The size, shape and position of the shim 8 should therefore be selected with care. This is apparent from FIG. 7(b), which shows the fibre assembly from above after deposition and consolidation. The shaded area is where the glass material has been deposited, and the dotted lines indicate the location of the optical fibres 1 under the deposited and then consolidated glass. The unshaded area corresponds to the position of the shim, and no glass material was deposited in this region. The optical fibres 1 are therefore exposed in this region, which may be desirable for some applications.

Figure 8:
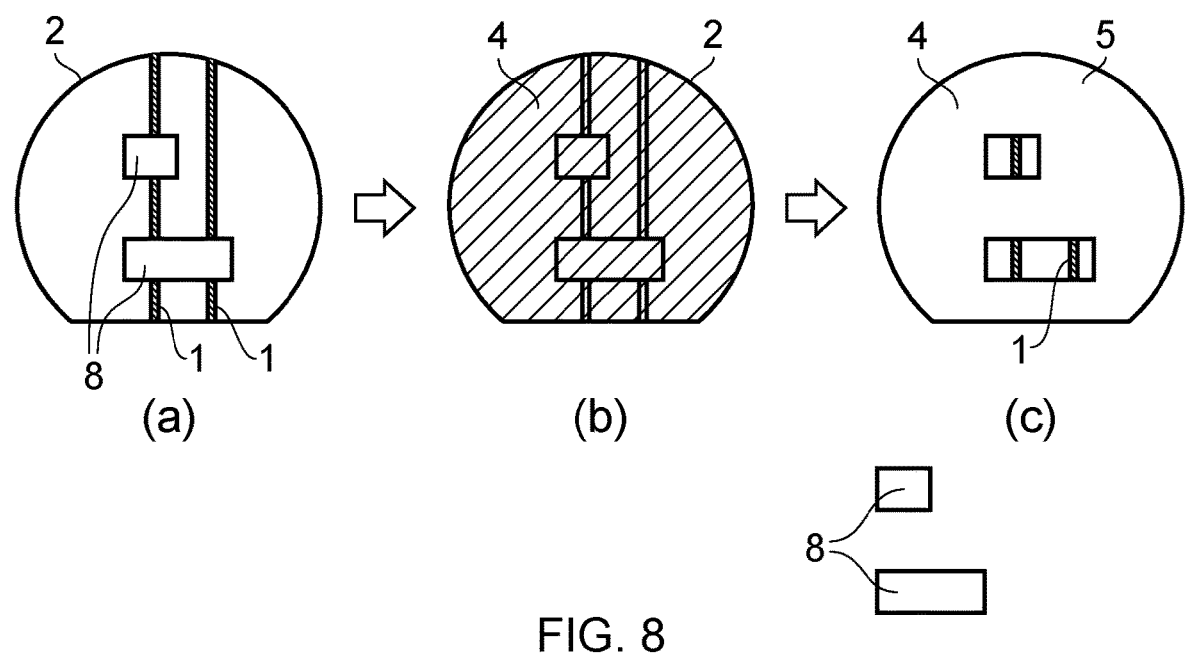
FIGS. 8(a), 8(b) and 8(c) show plan views of steps in a method according to the invention in which shims are used to position and mask fibres on a substrate.

FIG. 8 shows views of a fibre assembly from above, to further illustrate the use of shims, to show how they may be used to intentionally mask or expose regions of the fibre assembly to create a particular device geometry. In FIG. 8(a), two optical fibres 1 are placed parallel to each other on a substrate 2, and held in place with two shims 8. A first shim is larger and placed so that it extends over both fibres 1. The second shim is smaller and is placed so that it extends over only one fibre 1, and is spaced apart from the first shim. In FIG. 8(b), the glass material 4 has been deposited over the whole substrate surface, covering the substrate 2, the fibres 1 and the shims 8. In FIG. 8(c), the shims 8 have been removed and the glass material 4 has been consolidated. The protection afforded by the shims 8 during deposition has created two "windows" in the consolidated amorphous material through which the optical fibres 1 are exposed. This technique provides access to the fibres for processes such as cleaving and splicing.

Figure 9:
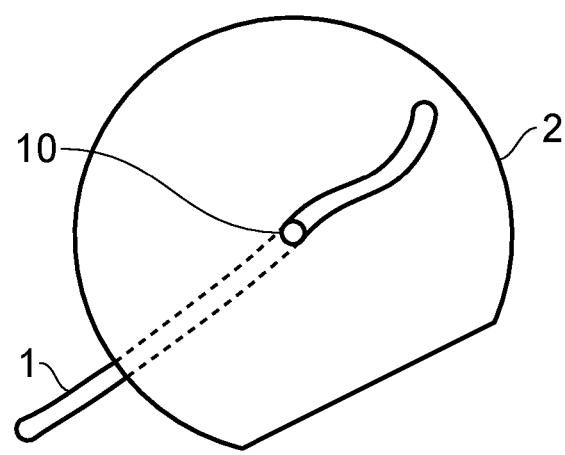
FIGS. 9(a) and 9(b) show a perspective view and a cross-sectional side view of an optical fibre positioned on a substrate in a step of a method according to the invention, using a through hole for positioning.
Figure 9:
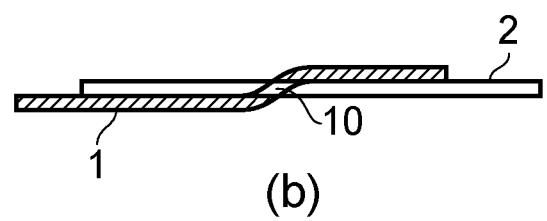

FIG. 9 shows views depicting a placement method using through-holes in a substrate. FIG. 9(a) shows a perspective view of a substrate 2 having a hole 10 cut through it. An optical fibre 1 has been fed through the hole 10. This can be used to hold the fibre 1 in position with respect to the substrate 2, and also to implement more complex fibre geometries. Multiple fibres might be fed through multiple holes, or one fibre might pass through two or more holes at different points along its length. FIG. 9(b) shows a side view of the arrangement of FIG. 9(a).

Figure 10:
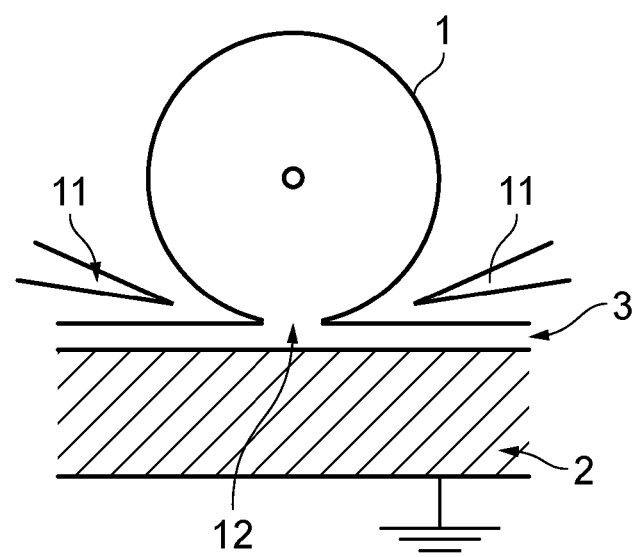
FIG. 10 shows an end view of apparatus for positioning an optical fibre onto a substrate in a step of a method according to the invention using fusion splicing.

FIG. 10 shows a cross-sectional view of a substrate and fibre arranged for positioning the fibre by fusion splicing. The fibre 1 is placed onto the substrate 2 with a buffer layer 3. The substrate 2 is earthed, and a pair of electrodes 11 are located so that an electric arc can be formed at a point where the optical fibre 1 is in contact with the substrate 2 (anodic fusion splicing). A small amount of melting is produced in the optical fibre and/or substrate materials, sufficient to fuse the fibre 1 and the substrate 2 at a splice 12. Further splices may be formed. This is sufficient to tack the fibre 1 into position for depositing the glass material. Fusion splicing methods using heat provided in other ways, such as from localised laser exposure (typically a $CO_2$ laser), may alternatively be used. Positions and configurations of the various components differing from those depicted in FIG. 10 may also be used.

As a further alternative, tungsten clips may be used to secure the optical fibre in position on the substrate.

Figure 11:
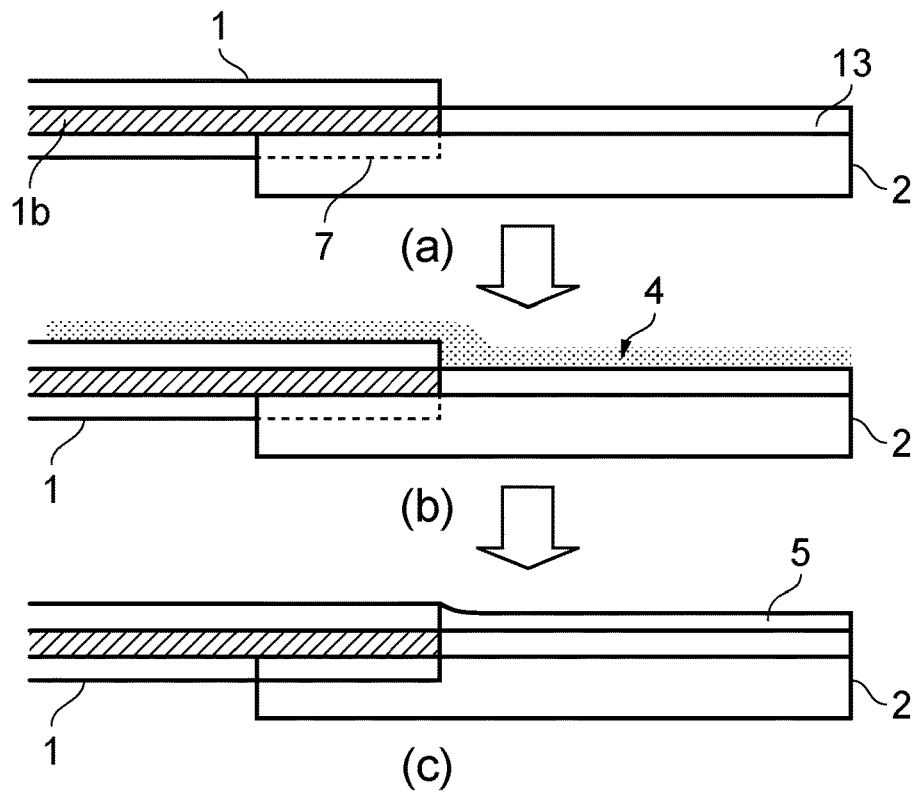
FIGS. 11(a), 11(b) and 11(c) show cross-sectional side views of steps in a method according to the invention, for bonding an optical fibre to a substrate having a planar waveguide.
Figure 12:
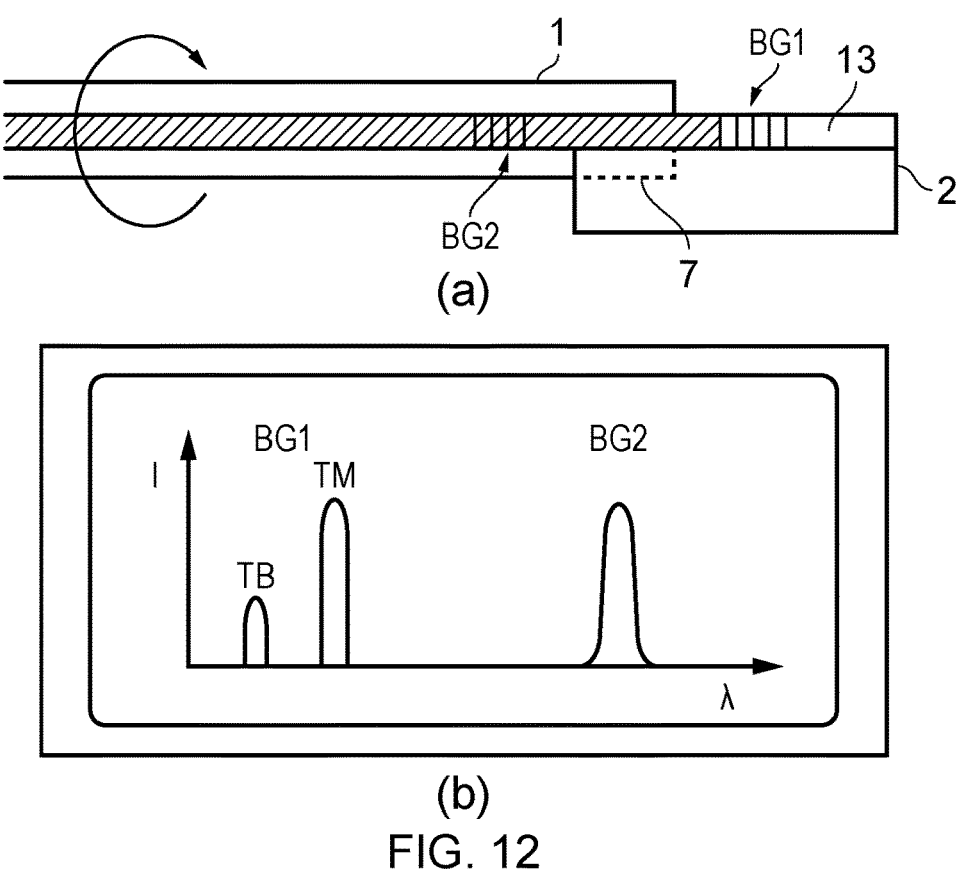
FIG. 12(a) shows a cross-sectional side view of a method for aligning an optical fibre to a planar waveguide in the method shown in FIG. 11, using Bragg gratings.
FIG. 12(b) shows an example spectrum measured from the Bragg gratings during alignment.

FIGS. 11 and 12 illustrate the use of Fibre Bragg Gratings (FBGs) and Planar Bragg Gratings (PBGs) to assist in fibre positioning and alignment of a fibre to a planar waveguide. A simple type of fibre/substrate assembly is a fibre pigtail, in which an optical fibre is bonded to a substrate containing a planar waveguide such that the fibre and waveguide are in optical alignment and light can travel from one to the other. The present invention can be used to fabricate assemblies of this type, with FBGs and PBGs used to aid alignment.

FIG. 11 shows a series of side views of a pigtail assembly during and after manufacture. In FIG. 11(a), an optical fibre 1 having a core 1b is placed into a trench 7 cut into a substrate 2 to make a pre-assembly. The substrate 2 has a planar waveguide 13 formed within it, and the trench 7 is located such that a fibre in the trench 7 can be brought into alignment with the waveguide 13. In FIG. 11(b), glass material (silica soot) 4 has been deposited over the surface of the pre-assembly, using FHD for example. In FIG. 11(c), consolidation has been carried out and the amorphous glass 5 has formed over the fibre 1 and the substrate 2 to bond them together.

FIG. 12 shows how Bragg gratings may be used to assist in this fabrication. FIG. 12(a) shows an optical fibre 1 placed in a trench 7 in a substrate 2 having a planar waveguide 13, as in FIG. 11(a). In this example, however, both the planar waveguide 13 and the optical fibre 1 have Bragg gratings (BG) defined therein. For alignment, the optical fibre 1 may manipulated by any or all of rotation (as shown by the arrow), linear movement in any or all of the x, y and z directions, and tilting (pitch and yaw) while light is directed along the fibre 1 or the waveguide 13. The degree of to alignment between the fibre 1 and the waveguide 13 affects how much light passes from one to the other, and this can measured by monitoring the light reflected or transmitted by the gratings. FIG. 12(b) shows an example of spectra measured from the two gratings BG1 and BG2. When the spectra indicate that optimum alignment has been achieved, the fibre can be secured in position, and the deposition and consolidation performed as in FIGS. 11(b) and 11(c). The gratings can be erased by the consolidation stage if not required in the intended optical device.

Note that the various fibre placement and positioning techniques described above are not mutually exclusive, and may be employed in combination if convenient or appropriate.

Machining

Figure 13:
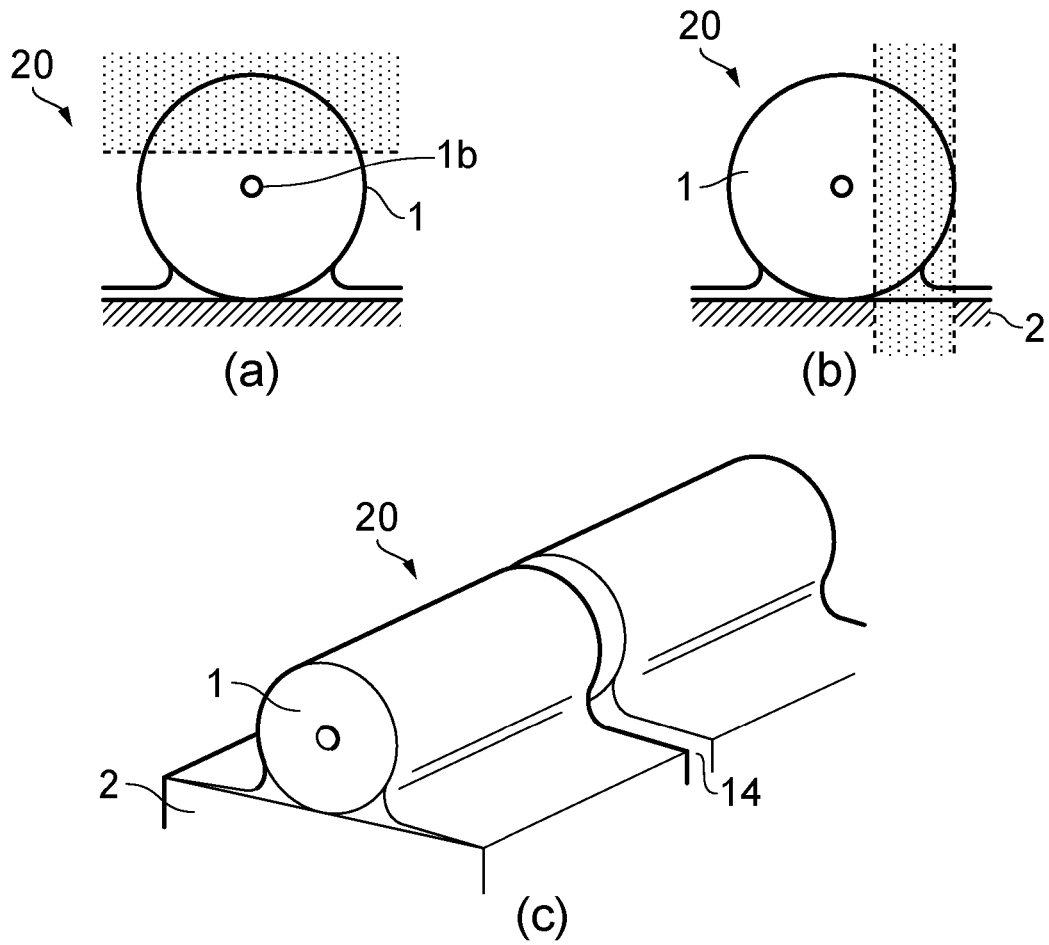
FIGS. 13(a), 13(b) and 13(c) show cross-sectional end views and a perspective view of optical fibre assemblies fabricated according to embodiments of the invention and further processed by machining.

FIG. 13 shows various views of fibre assemblies which have been physically modified by machining to enable different optical devices to be implemented. FIG. 13(a) shows a cross-sectional view of a fibre assembly 20 made according to the invention, and which will have an upper portion of the optical fibre 1 removed by a horizontal cut (by milling, for example), indicated by the shading portion. FIG. 13(b) shows a cross-sectional view of a similar fibre assembly 20 in which it is intended that a vertical portion of material parallel to the fibre length is cut away, thereby removing a side of the fibre 1. The optical fibres 1 are thereby made D-shaped. In this way, the core 1b of the fibre 1 can be made closer to the fibre surface, or exposed completely if more material is removed. Also, the smooth flat surface formed by the machining can be desirable for some applications, such as in sensors and actuators that rely on evanescent field exposure.

FIG. 13(c) shows a perspective view of a fibre assembly 20, in which a vertical cut has been made in the orthogonal direction, perpendicular to the fibre length and optical propagation direction. Thus, a trench or cavity 14 is formed passing through the diameter of the fibre 1 that may be extended into the substrate 2. Cavities such as these can be used to receive samples or modifying materials, the presence of which affects light propagating in the fibre in a measurable manner so that the fibre assembly can be used for applications such as particle counting (free space detection in the cavity), microfluidic detection (fluid sample in the cavity), and optical manipulation (polarising, waveplate, doped, graphene, quantum dot, carbon nanotube, semiconductor, filter, dye or nonlinear materials in the cavity).

Devices and Applications

The methods of the present invention can be used to fabricate optical fibre assemblies according to embodiments of the invention that can be designed for and used in a wide range of applications. A first category of devices uses precision layup of the fibres, for example to form matrix fibre arrays.

Figure 14:
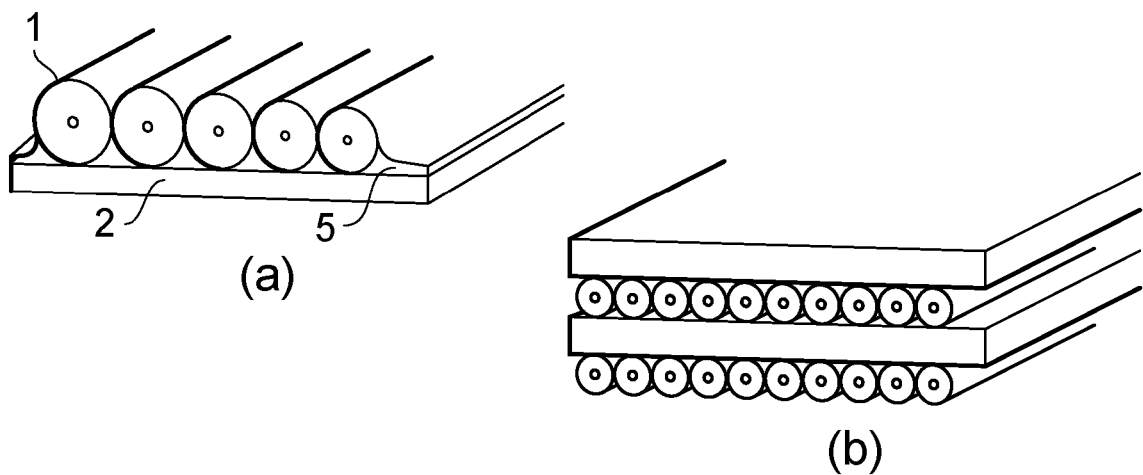
FIGS. 14(a) and 14(b) show perspective views of optical fibre assemblies in the form of fibre matrix arrays, according to embodiments of the invention.

FIG. 14 shows perspective views of example devices. Multiple fibres 1 have been bonded to a substrate 2 in a densely packed parallel configuration, to form a matrix. The fibres can all be positioned in a single step, followed by a single depositing step and a single consolidation step to form a single amorphous volume of consolidation glass material 5 securing the fibres 1 to the substrate 2. In FIG. 14(a) a single row of fibres has been packed on a substrate, whereas FIG. 14(b) shows a device comprising two rows of fibres. In this way, multiple fibres can be packed and environmentally homogenised by being secured to the same planar optical substrate. The silicon junction or interface layer formed by the consolidated glass can be utilised to manipulate cladding modes in the fibres, or for tolerance to extreme environments.

A matrix format of multiple fibres provides high mechanical robustness, which can be utilised for applications such as beam delivery and fibre packing. High temperature tolerance could be achieved, which is of benefit in large optical power handling systems.

Figure 15:
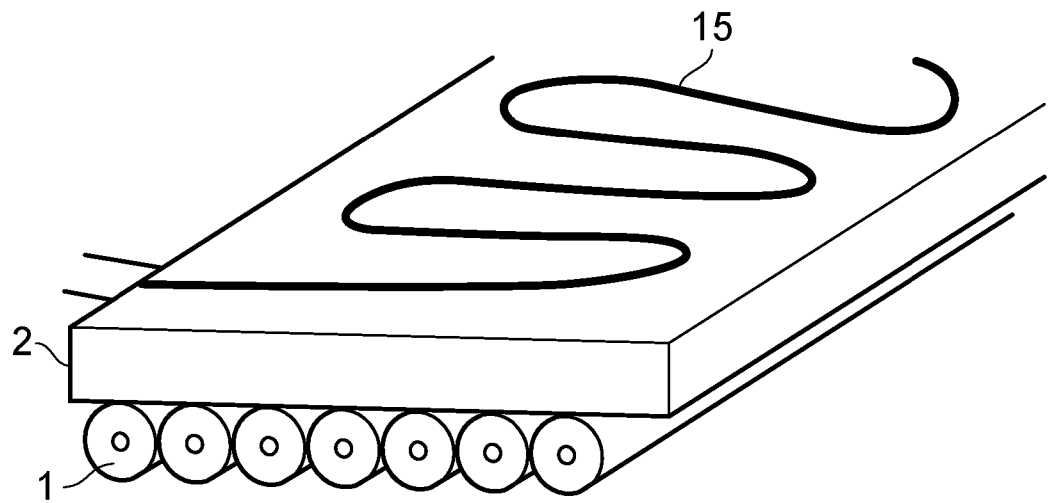
FIG. 15 shows a perspective view of an optical fibre assembly according to an embodiment of the invention having a cooling channel in its substrate.

FIG. 15 shows a perspective view of a further matrix fibre assembly. In this example, the temperature tolerance is assisted by the addition of one or more cooling loops 15 integrated into the substrate 2 carrying the matrix of closely packed fibres 1.

The invention enables precise layering of fibres onto a planar substrate, which offers repeatable precision when fabricating devices with set lengths of optical fibre waveguide. This is particularly useful in applications such as delay lines, Sagnac interferometers, laser gyroscopes, precision fibre length devices, and phase control devices in which the phase of light in a set length of fibre can be manipulated through integrated actuation, for example using thermal or piezoelectric elements.

Fibre matrix arrays may also be useful in optical lantern arrangements [8]. Optical lanterns rely on two-dimensional matrices of fibres, and this can be achieved by stacking rows of fibres sequentially between substrates as in FIG. 14(b), or by positioning two or more rows of fibres on a first row of fibres on a substrate. All the components can be bonded using consolidated glass material according to the invention.

Forming a matrix by using a small diameter fibre having a thin cladding thickness around a regular diameter core will allow high density precision layering of fibres to be achieved. This offers greater density for optical patching applications.

Figure 16:
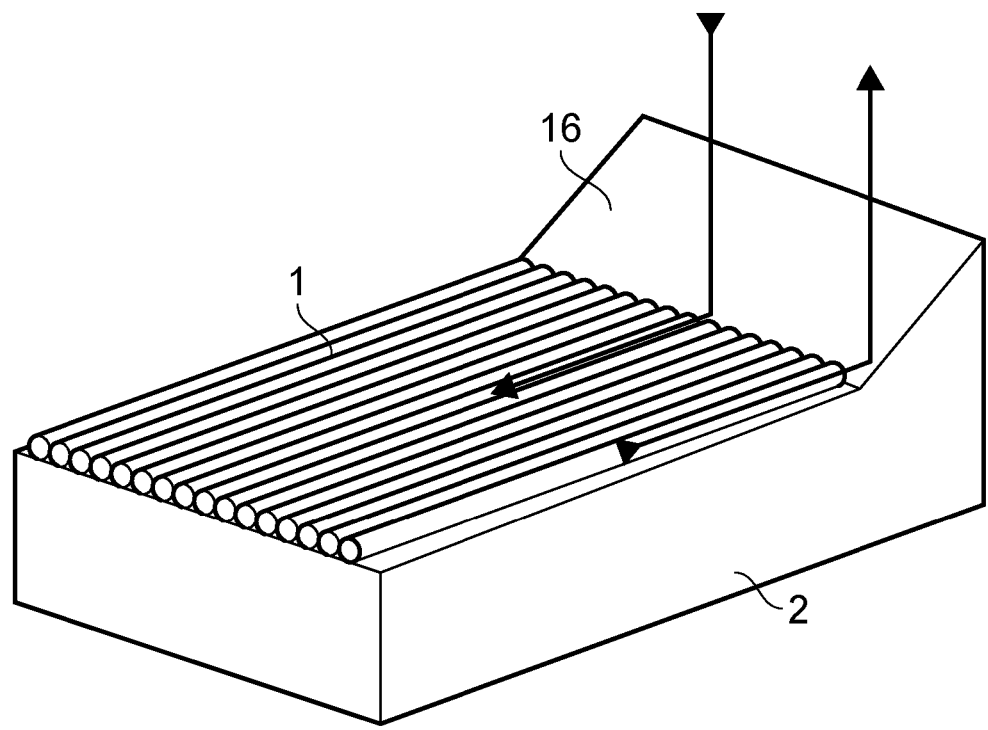
FIG. 16 shows a perspective view of an optical fibre assembly according to an embodiment of the invention and configured for backplane coupling.

FIG. 16 shows a perspective view of an optical fibre device using backplane coupling which may be fabricated according to the present invention. The substrate 2 includes a silicon wedge 16 arranged at an angle (in this example 45°) to the planar substrate surface and formed, for example, by machining of the substrate. A collection of ribbon fibres 1 is bonded to the substrate with their ends abutting or adjacent to the wedge 16, so that light in the fibres can couple directly into a microelectronic chip (optical backplane coupling). Lateral propagation of the light is reflected perpendicular to the chip and detectors or in reverse emitters.

A second category of devices for which the invention is useful are hybrid fibre planar devices, which use propagation of light in optical fibres and also in planar waveguides to which the fibres are coupled.

Figure 17A:
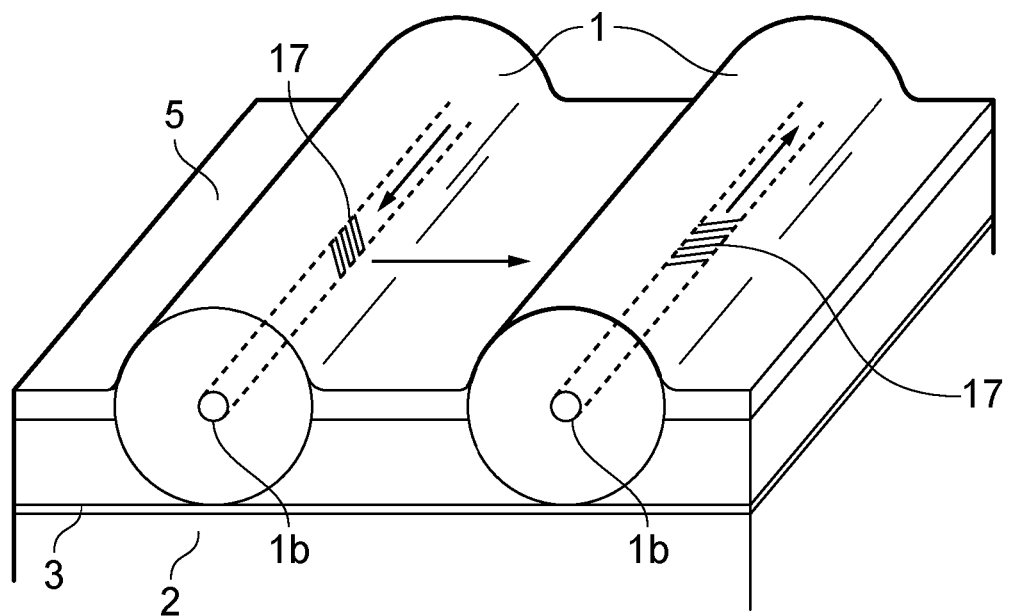
FIGS. 17A and 17B show perspective views of two optical fibre assemblies according to embodiments of the invention which include optical fibres having tilted Bragg gratings.

FIG. 17A shows a perspective view of a fibre Bragg grating device. Two fibres 1, which each have a tilted Bragg grating 17 written into the core 1b, are bonded to a single substrate 2. Such a design might be of use in Bragg fibre positioning ("layup"), which can be used to locate and environmentally stabilise Bragg gratings. These gratings could be written prior or post fabrication, and the tilted configuration can be used for coupling to other fibres or planar waveguides. They could also be used in a hybrid fibre planar device for sensing based applications or chip based telecommunication processing.

Figure 17B:
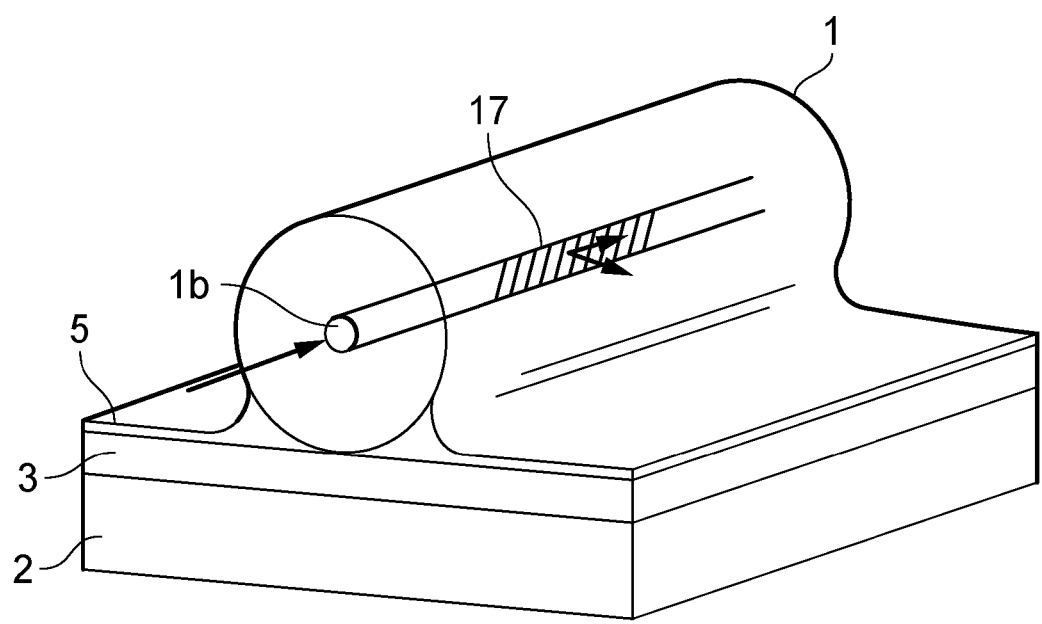

FIG. 17B shows a perspective view of another fibre Bragg grating device, similar to yet simpler than that of FIG. 17A. A fibre 1 is bonded to a substrate 2, and has a Bragg grating 17 written into the core 1b, tilted at about 45° to the light propagation direction. The fibre 1 may be a pre-aligned polarisation maintaining fibre. The device can operate as a fibre polariser. When light is injected into the fibre 1, the grating 17 acts to selectively eject optical power from one orthogonal polarisation while propagating the other polarisation (as indicated by the arrows in the Figure). This has application in high power lasers, to ensure lasing of one polarisation. Unlike conventional fibre polarisers, a device of this type according to the invention would be able to efficiently handle removal of power (via the ejected polarisation) with a reduced risk of failure, largely due to the reduced amount of inherent structural defects achievable by the invention. Furthermore, the substrate, for example being of silicon, can thermally stabilise the system and act to strip optical power from the consolidated glass, for example silica, due to the higher refractive index of silicon.

In another application, existing fibre components such as fibre couplers may be environmentally and mechanically stabilised by attaching or integrating them "on chip", i.e. onto a substrate using methods of the invention. Greater component density could be achieved. Selection of the various glass materials can be used to tailor devices for particular applications. For example, depositing a glass material for consolidation which has a higher refractive index than the cladding of the optical fibre components can be used to strip unwanted cladding modes from a system.

The applications discussed thus far typically use fibres with a relatively thick cladding layer. However, if the fibre used consists solely of a core or has minimal cladding, the core guiding mode has its evanescent field exposed, which can be exploited for particular application. The present invention could be used with such fibres to fabricate low-loss photonic circuits. In this instance, the consolidated amorphous glass material acts as the cladding material.

Figure 18:
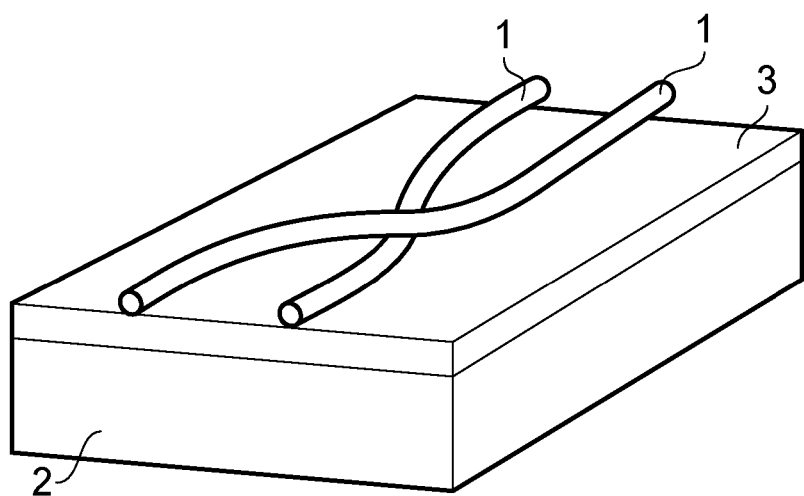
FIG. 18 shows a perspective view of an optical fibre assembly according to an embodiment of the invention having two optical fibres configured for cross-coupling.

FIG. 18 shows a perspective view of an example photonic circuit of this type. Two fibres 1 are positioned on the substrate 2 such that one fibre passes over the other, with the fibres in near or actual contact, to realise a cross coupler. The fibres might be positioned using trenches of different depths as illustrated in FIG. 6, for example.

During layup of the fibres on the substrate according to the invention, the alignment of the fibre surface with respect to the planar substrate surface can be manipulated. For example, one can arrange a set twist along the fibre. Applications for this include the manipulation of polarisation (i.e. TE to TM), or inducing a set chiral stress within the fibre. Additionally, anisotropic stress fields can be applied during layering up and before consolidation. These concepts can also be used to build components in optical circuit fabrication.

The invention facilitates the direct integration of planar optical processing (i.e. in a planar waveguide on a substrate) to an optical fibre platform. Possibilities of this type include but are not limited to phase manipulation using thermo-optic (e.g. heating elements), stress-optic (e.g. electro-restrictive and magneto-restrictive elements); and electro-optic (e.g. electro-optic elements) devices, where the various elements are materials directly inserted into the propagation direction of the waveguide or to positioned to access the evanescent field of a guided core or cladding mode.

The mechanical robustness of devices fabricated according to the invention is appropriate for acoustic packaging applications. For example, the robustness can be exploited to enable the acoustic focusing of a vibrational input (e.g. via an acousto-optic modulator) into the core and/or cladding of an optical fibre of a fibre assembly.

The fibre assemblies also have microfluidic compatibility. Planar processing can be used to form microfluidic channels in, on or through the optical fibre, or fibres in combination with one or more planar waveguides defined in the substrate, to realise a range of microfluidic devices.

The fabrication process of the invention lends itself to the manipulation of cladding modes of the optical fibre or fibres, which is of use in various optical devices. Cladding modes could either stripped altogether by depositing a glass material for consolidation that has a composition with a refractive index greater than the cladding of the fibre, or might be coupled into via guiding in the planar layer.

The invention can also be utilised for the manufacture of optical MEMS devices, where MEMS-like optical components can be introduced to the fibre assembly through planar processing.

Figure 19:
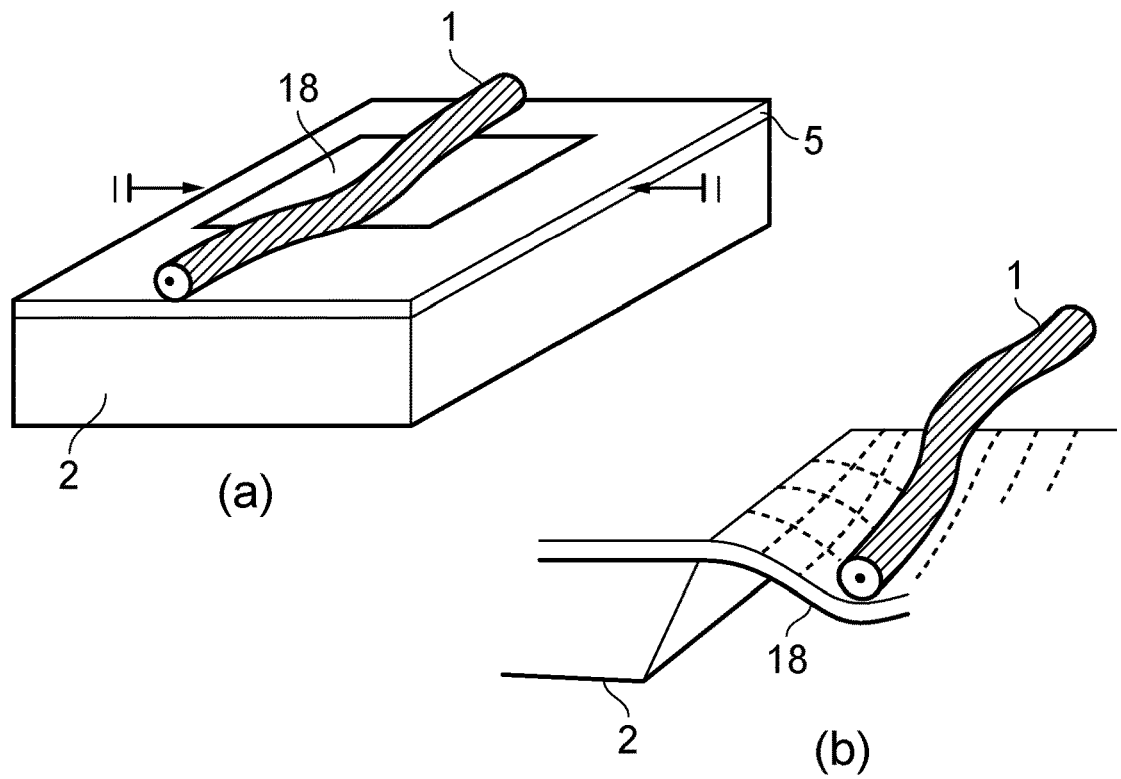
FIGS. 19(a) and 19(b) shows a perspective view and a close-up cross sectional view of an optical fibre assembly according to an embodiment of the invention which includes a MEMS structure membrane.

FIG. 19 shows views of a first example of such a MEMS device. FIG. 19(a) is a perspective view. A fibre 1 bonded to a substrate 2 overlies a membrane structure 18, created by the partial removal of underlying substrate material and consolidated glass material 5. Through dopant manipulation in the deposited glass material, stress properties in the membrane can be tailored for particular applications. FIG. 19(b) shows a cross-section through the device along line I-I.

Figure 20:
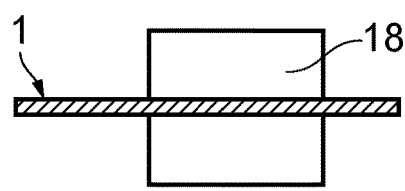
FIGS. 20(a), 20(b) and 20(c) shows plan views of optical fibre assemblies incorporating other MEMS structures.
Figure 20:
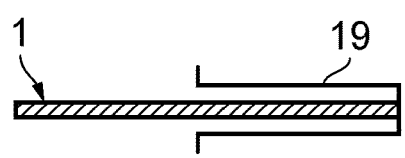
Figure 20:
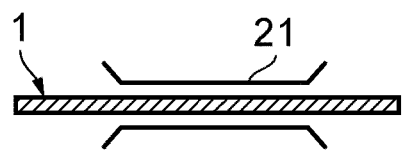

FIG. 20 shows schematic representations of other examples of MEMS-like structures achievable on fibre assemblies made using the invention. In FIG. 20(a), a fibre 1 passes over a membrane 19, in FIG. 20(b) a fibre 1 sits on a cantilever structure 19, and in FIG. 20(c) a fibre 1 is supported on a bridge 21.

Other applications for which the invention may be used include devices configured for stress manipulation on an optical fibre such as by physical bulk actuation, to produce optical interactions such as four wave mixing; the packaging of pre-processed fibre components such as fibre couplers; and narrow line laser devices, enabled due to the environmental stabilisation offered by fibre assemblies according to embodiments of the invention (mechanical robustness, acoustic engineering, high temperature tolerance, and cooling offered by a configuration such as that of FIG. 15).

A third category of applications for which the invention is well-suited is that of optical pump schemes, both for fibre lasers and for amplification applications. Configurations which may be produced using the invention include assemblies arranged for side pumping of an optical fibre; for end pumping of an optical fibre, plus a ridge structure to laterally confine the pump beam; and for end pumping with some glass material etched away after assembly fabrication to vertically confine the beam with a high numerical aperture.

Figure 21:
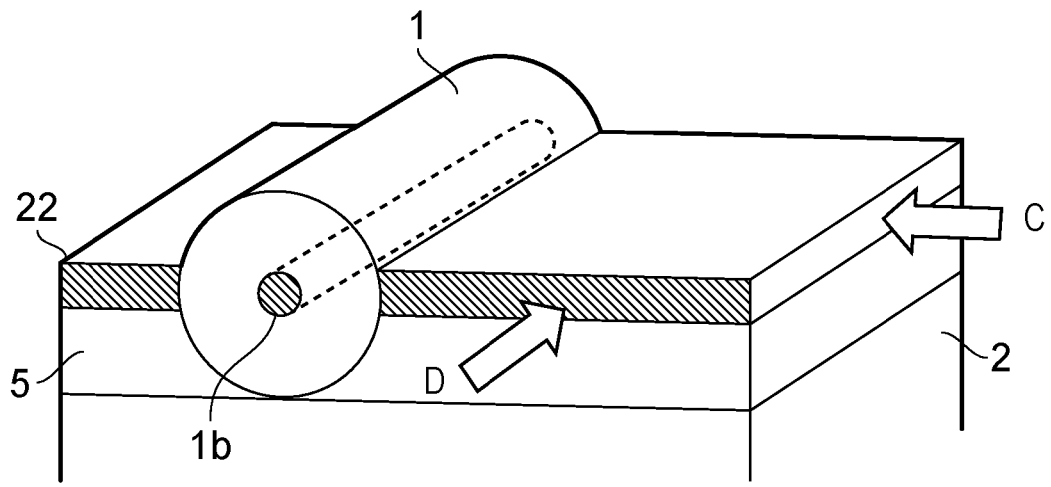
FIG. 21 shows a perspective view of an optical fibre assembly according to an embodiment of the invention configured for side or end pumping of the optical fibre.

FIG. 21 shows a perspective view of a device configured for side or end pumping of the optical fibre 1. Consolidation of deposited silica 5 to secure the fibre 1 also forms a thick underclad layer for guiding of a pump mode. Then, a planar core layer 22 with a tailored refractive index difference compared to the underclad layer is deposited onto the underclad layer. The core layer 22 is in a plane with the fibre's core 1b. Pump light can be propagated in the core layer 22 and will couple into the fibre core 1b by an end geometry (arrow D) or a side geometry (arrow C).

Figure 22:
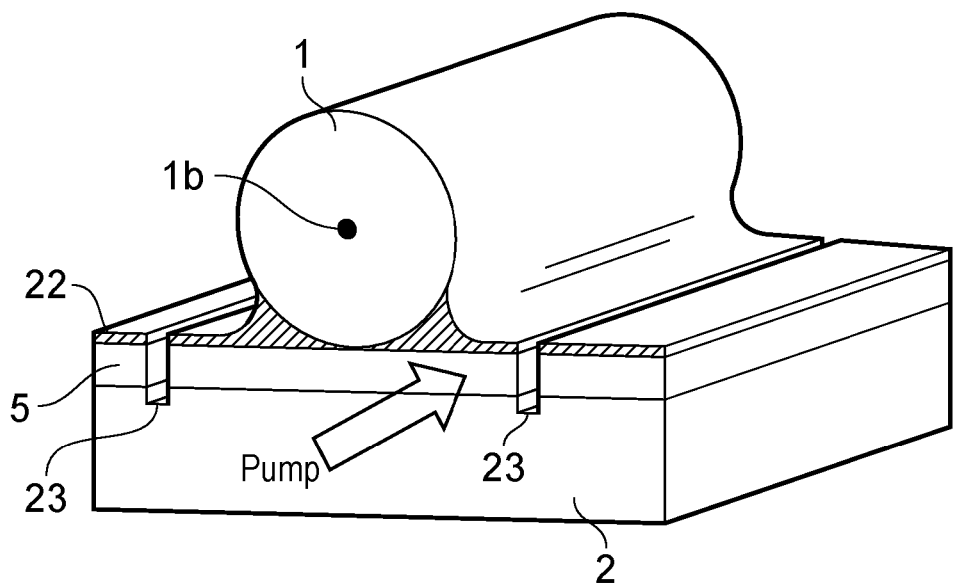
FIG. 22 shows a perspective view of an optical fibre assembly according to an embodiment of the invention configured for end pumping of the optical fibre.

FIG. 22 shows a perspective view of a device configured for end pumping of the optical fibre. A end pumped geometry with the planar core layer not in plane to the fibre's core. The deposited and consolidated material is again configured to provide a planar core layer for pump propagation, but in this example the core layer is not in plane with the core 1b of the fibre 1. Grooves 23 are etched into the consolidated layers 5, 22 and the substrate 2 to confine the pump beam.

Finally, in the above and other devices, thermal conductivity offered by the substrate can be utilised to achieve thermal stabilisation of the bonded fibres. This can be combined with integrated cooling loops as illustrated in FIG. 15. Examples of uses include uniform thermal management of a devices, thermally and environmentally stabilised fibres, and stress manipulation in the consolidated medium.

The present invention therefore provides an improved method for fabricating assemblies comprising one or more optical fibres bonded to a substrate, capable of producing assemblies which are both mechanically and optically superior to devices produced by known methods. Appropriate selection of materials can be used to tailor device properties for a range of applications, and additional processing steps and components can be incorporated to produce a large variety of optical devices.

REFERENCES

[1] U.S. Pat. No. 7,058,275
[2] U.S. Pat. No. 7,620,277
[3] D. J. Ripin and L. Goldberg, "High efficiency side-coupling of light into optical fibres using imbedded v-grooves," Electron. Lett., vol. 31, no. 25, pp. 2204-2205, 1995.
[4] J. P. Koplow, S. W. Moore, and D. a. V. Kliner, "A new method for side pumping of double-clad fiber sources," IEEE J. Quantum Electron., vol. 39, no. 4, pp. 529-540, April 2003.
[5] V. P. Wnuk, P. O. Box, A. Mendez, C. Ave, S. Ferguson, and T. Graver, "Process for Mounting and Packaging of Fiber Bragg Grating Strain Sensors for use in Harsh Environment Applications by," Smart Struct. Conf., vol. 5758-6, 2005.
[6] R. Knechtel, "Glass frit bonding: an universal technology for wafer level encapsulation and packaging," Microsyst. Technol., vol. 12, no. 1-2, pp. 63-68, October 2005.
[7] A. Saran, D. C. Abeysinghe, R. Flenniken, and J. T. Boyd, "Anodic bonding of optical fibers-to-silicon for integrating MEMS devices and optical fibers," J. Micromechanics Microengineering, vol. 13, pp. 346-351, 2003.
[8] D. Noordegraaf, P. M. W. Skovgaard, and M. D. Nielsen, "Efficient multi-mode to single-mode coupling in a photonic lantern," Opt. Express, vol. 17, no. 3, pp. 1988-1994, 2009.

The invention claimed is:

1. A method of forming an optical fibre assembly, comprising:
providing a planar substrate made of a first material;
positioning an optical fibre with an outer layer of a first glass material on a surface of the substrate to form a pre-assembly in which the optical fibre is not bonded to the substrate by any glass material;
depositing a further glass material onto the pre-assembly, over at least a part of the optical fibre on a side opposite the substrate and adjacent parts of the substrate surface; and
heating the pre-assembly to consolidate the further glass material into an amorphous volume in contact with at least parts of the surface of the substrate and the outer layer of the optical fibre, thereby bonding the optical fibre to the substrate to create the optical fibre assembly.

2. A method according to claim 1, wherein the first glass material and the further glass material are substantially the same material or are miscible alloys of each other.

3. A method according to claim 2, wherein the first material is substantially the same as or a miscible alloy of the first glass material and/or the further glass material.

4. A method according to claim 1, wherein an interface between the outer layer and the amorphous volume and/or an interface between the amorphous volume and the planar substrate are optically transmissive to wavelengths of light supported by the optical fibre.

5. A method according to claim 1, wherein the further glass material comprises silica.

6. A method according to claim 1, wherein the further glass material comprises a non-silicate glass.

7. A method according to claim 1, wherein the further glass material is a soot.

8. A method according to claim 7, wherein the soot is deposited using flame hydrolysis deposition.

9. A method according to claim 1, wherein the substrate has an oxide layer on its surface.

10. A method according to claim 9, wherein the oxide layer is thermally grown.

11. A method according to claim 9, further comprising forming the oxide layer on the surface of the substrate.

12. A method according to claim 1, wherein the further glass material includes one or more dopants.

13. A method according to claim 12, further comprising adding one or more dopants to the further glass material after depositing it, by solution doping or pressurised gas saturation.

14. A method according to claim 8, further comprising adding one or more dopants to the soot by injecting precursor vapours containing the one or more dopants into the flame hydrolysis deposition flame.

15. A method according to claim 12, wherein the one or more dopants comprise one or more of germanium, phosphorus, boron, aluminium, lead, bismuth, erbium, titanium, tin, ytterbium, neodymium, sodium, barium, calcium, lanthanum, holmium and silver.

16. A method according to claim 1, wherein positioning the optical fibre on the surface of the substrate comprises laying the optical fibre in a trench or groove in the substrate surface.

17. A method according to claim 16, further comprising positioning one or more further optical fibres on the surface of the substrate by laying the one or more further optical fibres in one or more further trenches or grooves in the substrate surface, where at least two trenches or grooves have different depths.

18. A method according to claim 1, wherein positioning the optical fibre onto the surface of the substrate comprises fusion splicing the optical fibre into its position.

19. A method according to claim 1, wherein positioning the optical fibre onto the surface of the substrate comprises passing the optical fibre through one or more holes in the substrate.

20. A method according to claim 1, wherein positioning the optical fibre onto the surface of the substrate comprises holding the optical fibre in position with one or more shims or mechanical clips.

21. A method according to claim 1, wherein the optical fibre includes a Bragg grating, and the substrate includes a planar waveguide having a Bragg grating and positioning the optical fibre on the surface of the substrate includes monitoring light reflected or transmitted from the Bragg gratings.

22. A method according to claim 1, further comprising masking one or more areas of the substrate surface and/or the positioned optical fibre before depositing the further glass material to prevent deposition of the further glass material onto the masked areas.

23. A method according to claim 1, further comprising, after consolidation, machining the optical fibre assembly to remove a part or parts of the substrate and/or the optical fibre.

24. A method according to claim 1, in which the substrate is a silica, silicon or sapphire substrate.

25. An optical fibre assembly fabricated according to the method of claim 1.

* * * * *